United States Patent
Glugla et al.

(10) Patent No.: US 9,528,406 B2
(45) Date of Patent: Dec. 27, 2016

(54) SYSTEMS AND METHODS FOR PURGE AND PCV CONTROL

(71) Applicant: Ford Global Technologies, LLC, Dearborn, MI (US)

(72) Inventors: Chris Paul Glugla, Macomb, MI (US); Daniel Joseph Styles, Canton, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 14/284,904

(22) Filed: May 22, 2014

(65) Prior Publication Data

US 2015/0337696 A1    Nov. 26, 2015

(51) Int. Cl.
| | |
|---|---|
| *F01B 13/04* | (2006.01) |
| *F02M 35/10* | (2006.01) |
| *F02B 25/06* | (2006.01) |
| *F01M 13/00* | (2006.01) |
| *F02M 25/08* | (2006.01) |
| *F02D 41/00* | (2006.01) |
| *F02D 41/14* | (2006.01) |
| *F02D 21/08* | (2006.01) |
| *F02B 57/08* | (2006.01) |
| *F02B 75/02* | (2006.01) |

(Continued)

(52) U.S. Cl.
CPC .............. *F01M 13/00* (2013.01); *F02D 21/08* (2013.01); *F02D 41/003* (2013.01); *F02D 41/004* (2013.01); *F02D 41/0065* (2013.01); *F02D 41/0082* (2013.01); *F02D 41/1439* (2013.01); *F02D 41/1446* (2013.01); *F02D 41/1448* (2013.01); *F02D 41/1454* (2013.01); *F02D 41/1458* (2013.01); *F02M 25/08* (2013.01); *F01B 13/045* (2013.01); *F02B 57/00* (2013.01); *F02B 57/08* (2013.01); *F02B 75/265* (2013.01); *F02B 2075/025* (2013.01); *Y02T 10/47* (2013.01)

(58) Field of Classification Search
CPC ....... F02B 75/265; F01B 13/045; F01B 57/00; F01B 57/08; F01B 2075/025; F02M 35/10072; F02M 35/1045; F02M 35/10354; F02M 35/1034
USPC ...................................................... 123/43 R
See application file for complete search history.

(56) References Cited

U.S. PATENT DOCUMENTS

| | | |
|---|---|---|
| 6,138,650 A | 10/2000 | Bailey |
| 6,543,230 B1 | 4/2003 | Schmid |

(Continued)

OTHER PUBLICATIONS

Alger, Terry et al., "Dedicated EGR: A New Concept in High Efficiency Engines," SAE Technical Paper Series No. 2009-01-0694, Southwest Research Institute.

(Continued)

*Primary Examiner* — Lindsay Low
*Assistant Examiner* — Charles Brauch
(74) *Attorney, Agent, or Firm* — Julia Voutyras; Alleman Hall McCoy Russell & Tuttle LLP (57) ABSTRACT

Methods and systems are provided for improving purge air-fuel ratio control. Fuel vapors from a canister and the crankcase are selectively purged to a group of cylinders and not to remaining engine cylinders. Exhaust is recirculated from the selected group of cylinders to the engine intake wherefrom the EGR is ingested in the remaining engine cylinders and the selected group of cylinders.

20 Claims, 6 Drawing Sheets

(51) Int. Cl.
F02B 75/26 (2006.01)
F02B 57/00 (2006.01)

(56) References Cited

U.S. PATENT DOCUMENTS

| | | |
|---|---|---|
| 8,291,891 B2 | 10/2012 | Alger, II et al. |
| 8,539,768 B2 | 9/2013 | Hayman et al. |
| 8,561,599 B2 | 10/2013 | Gingrich et al. |
| 2006/0249115 A1* | 11/2006 | Hashimoto et al. ..... 123/184.55 |
| 2011/0094482 A1* | 4/2011 | Weber ..................... F02B 47/08 123/568.12 |
| 2012/0204844 A1* | 8/2012 | Gingrich et al. ........ 123/568.11 |
| 2012/0285163 A1 | 11/2012 | Hayman et al. |
| 2013/0105009 A1* | 5/2013 | Oda .............................. 137/517 |
| 2014/0116399 A1 | 5/2014 | Ulrey et al. |

OTHER PUBLICATIONS

Glugla, Chris Paul et al., "Method and System for Pre-Ignition Control," U.S. Appl. No. 14/162,634, filed Jan. 23, 2014, 69 pages.

* cited by examiner

SYSTEMS AND METHODS FOR PURGE AND PCV CONTROL

FIELD

The present description relates to systems and methods for improving purging of fuel vapors and positive crankcase ventilation vapors into an engine intake. The methods may be particularly useful for engines that include a sole cylinder that provides external EGR to other engine cylinders.

BACKGROUND AND SUMMARY

Vehicle emission control systems may be configured to store fuel vapors from fuel tank refueling and diurnal engine operations in a charcoal canister. During a subsequent engine operation, the stored vapors can be purged into the engine where they are combusted. In addition to canister fuel vapors, positive crankcase ventilation fuel vapors may also be ingested and combusted in the engine during engine operation.

One common issue with the purging of crankcase and canister hydrocarbons to an engine intake is the control of a combustion air-fuel ratio. In particular, due to large discrepancies in the estimation of fuel vapor concentrations from the canister and the crankcase, it may be difficult to control the air-fuel ratio of the cylinders where the vapors are introduced for combustion. As such, the air fuel ratio errors can lead to degraded engine performance and elevated exhaust emissions.

The inventors herein have recognized that more reliable air-fuel ratio control can be achieved during purging in engine systems configured with a sole cylinder that is dedicated for providing external EGR to other engine cylinders. In particular, engine systems with a dedicated EGR cylinder may be configured to operate the dedicated cylinder providing the EGR richer than stoichiometry while adjusting fueling of the non-dedicated cylinders (that is, the remaining engine cylinders) to maintain an overall stoichiometric exhaust. As a result, the dedicated EGR cylinder may have a higher tolerance for deviations from a desired air fuel ratio. Further, there may be multiple opportunities for accurately estimating and addressing air-fuel ratio deviations at both the EGR cylinder as well the non-dedicated EGR cylinders. For example, a first air-fuel ratio sensor coupled to the dedicated EGR cylinder may enable air-fuel ratio deviations arising at the dedicated EGR cylinder (such as due to the purging of fuel vapors to the dedicated EGR cylinder) to be estimated and corrected for. In addition, air-fuel ratio deviations arising at the non-dedicated EGR cylinders due to recirculation of exhaust gas from the dedicated EGR cylinder can be better estimated and compensated for based on the output of the first air-fuel ratio sensor. Further still, air-fuel ratio deviations can be estimated based on the output of a second air-fuel ratio sensor coupled to the non-dedicated EGR cylinders and used to correct the fueling of both the dedicated EGR cylinder as well the remaining engine cylinders. Consequently, more accurate air fuel ratio control can be achieved during purging conditions by allowing the dedicated EGR cylinder to be enriched with at least the purge vapors, while the engine air fuel ratio is controlled more strictly at the remaining cylinders.

Thus, in one example, purge control is improved by a method comprising selectively purging fuel vapors from one or more of a fuel system canister and a crankcase to enrich only a dedicated cylinder group of a multi-cylinder engine and recirculating exhaust gas from the dedicated cylinder group to each of remaining non-dedicated EGR engine cylinders and the dedicated cylinder group. In this way, air-fuel ratio control during purging is improved.

As an example, in response to purging conditions being met, fuel vapors from a fuel system purge canister as well as from crankcase ventilation may be purged to a single dedicated EGR cylinder of a multi-cylinder engine. Based on the purge rate, fueling of the dedicated EGR cylinder may be adjusted so that the cylinder is operated richer than stoichiometry. As such, the purge content received in the dedicated EGR cylinder may be feed-forward estimated based on the canister load, purge rate, etc. The rich exhaust from the cylinder may be passed through a water gas shift (WGS) catalyst coupled downstream of the cylinder for the purpose of creating hydrogen from the hydrocarbons in the rich exhaust. Hydrogen enriched exhaust from the dedicated EGR cylinder is then recirculated via an EGR passage to all the engine cylinders. An air-fuel ratio of the hydrogen enriched EGR received in the engine cylinders may be estimated based on the output of an air-fuel ratio sensor coupled downstream of the EGR donating cylinder. Fueling of the non-dedicated cylinders is then adjusted based on the air-fuel ratio of the received EGR so as to maintain stoichiometric combustion.

In this way, stoichiometric air-fuel ratio control is enabled in non-dedicated EGR cylinders without requiring accurate estimation of purge content. By selectively delivering purge fuel vapors to a dedicated EGR cylinder, at least a portion of the cylinder enrichment may be provided by purge vapors, improving fuel usage. By delivering hydrogen enriched EGR from the purge vapor receiving cylinder to all or only the non-dedicated engine cylinders, combustion stability of a highly EGR diluted engine is improved, allowing the engine to operate more efficiently.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
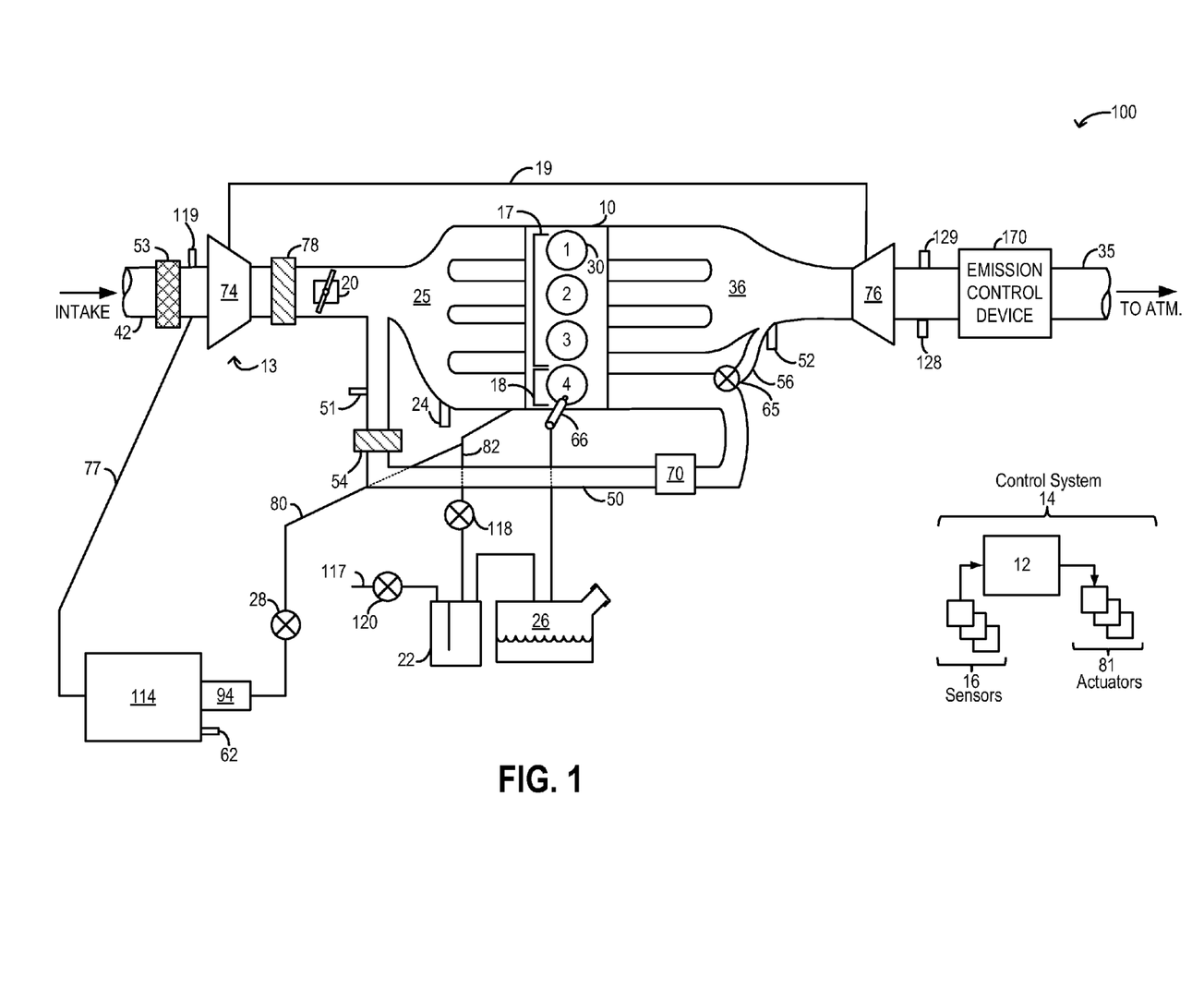
FIG. 1 is a schematic diagram of an engine system including a dedicated EGR donating cylinder group.
Figure 2:
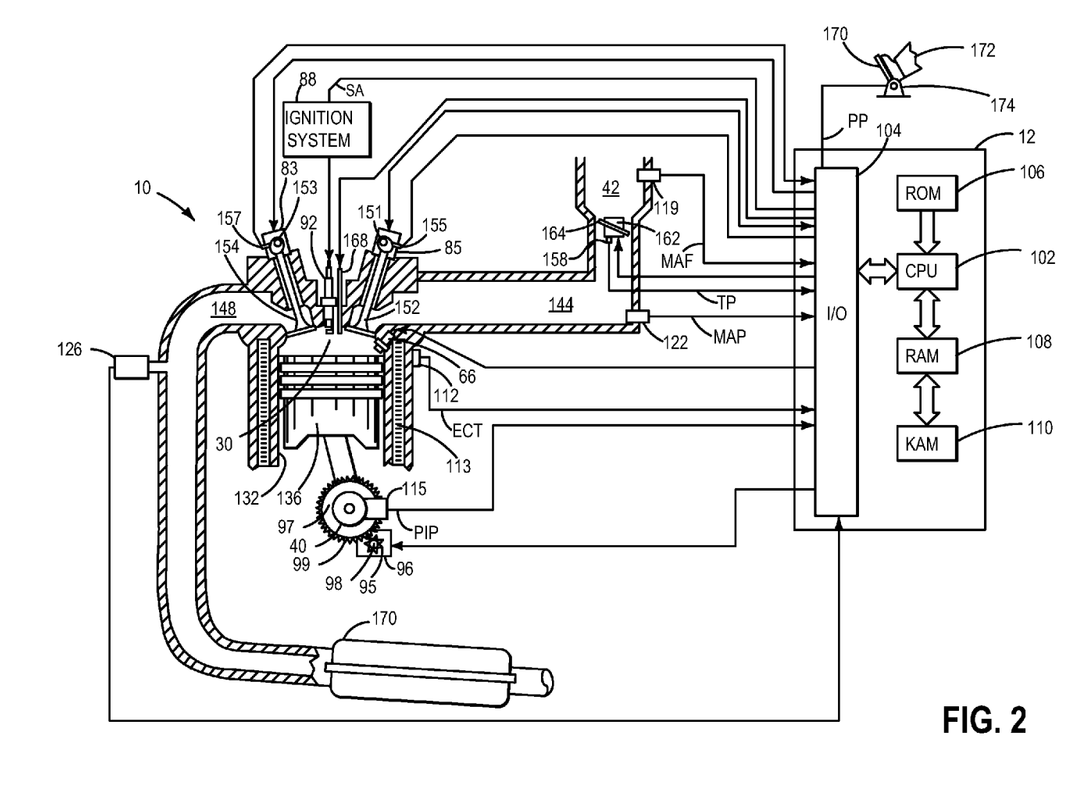
FIG. 2 is a schematic depiction of a combustion chamber of the engine.

The present description is related to purging fuel vapors to an engine operating with highly diluted cylinder mixtures, such as the engine systems of FIGS. 1-2. The engine cylinder mixtures may be diluted using recirculated exhaust gases (EGR) that are byproducts of combusting air-fuel mixtures. A controller may be configured to perform a control routine, such as the routine of FIGS. 3-4 to purge fuel vapors from a fuel system canister and blow-by bases from crankcase ventilation to a dedicated cylinder group of the engine. The controller may further adjust fueling to the dedicated EGR cylinder group based on a feed-forward estimate of purge content to operate the dedicated EGR cylinder group at a target air-fuel ratio. Fueling of the non-dedicated EGR cylinders is then adjusted based on the EGR received to provide an overall stoichiometric exhaust. Example fueling and air-fuel ratio adjustments are shown with reference to FIGS. 5-6.

FIG. 1 schematically shows aspects an example engine system 100 including an engine 10 with four cylinders (1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 53 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed and load to avert compressor surge.

Intake manifold 25 is coupled to a series of combustion chambers 30 through a series of intake valves (see FIG. 2). The combustion chambers are further coupled to exhaust manifold 36 via a series of exhaust valves (see FIG. 2). In the depicted embodiment, exhaust manifold 36 includes a plurality of exhaust manifold sections to enable effluent from different combustion chambers to be directed to different locations in the engine system. In particular, effluent from the first cylinder group 17 (cylinders 1-3) is directed through turbine 76 of exhaust manifold 36 before being processed by an exhaust catalyst of emission control device 170. Exhaust from the second cylinder group 18 (cylinder 4), in comparison, is routed back to intake manifold 25 via passage 50, and exhaust catalyst 70. Alternatively, at least a portion of exhaust from the second cylinder group is directed to turbine 76 of exhaust manifold 48 via valve 65 and passage 56. By adjusting valve 65, a proportion of exhaust directed from cylinder 4 to the exhaust manifold relative to the intake manifold may be varied. In some examples, valve 65 and passage 56 may be omitted.

Exhaust catalyst 70 is configured as a water gas shift (WGS) catalyst. WGS catalyst 70 is configured to generate hydrogen gas from rich exhaust gas received in passage 50 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders.

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the second cylinder group to the remaining engine cylinders. A second exhaust gas sensor 52 may be positioned downstream of the exhaust manifold sections of the first cylinder group for estimating an air-fuel ratio of exhaust in the first cylinder group. The first and second exhaust gas sensors may be air-fuel ratio sensors such as a Universal Exhaust Gas Oxygen (UEGO) sensor. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Fuel tank 26 stores a volatile liquid fuel combusted in engine 10. To avoid emission of fuel vapors from the fuel tank and into the atmosphere, the fuel tank is vented to the atmosphere through adsorbent canister 22. The adsorbent canister may have a significant capacity for storing hydrocarbon-, alcohol-, and/or ester-based fuels in an adsorbed state. For example, canister 22 may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. In the configuration shown in FIG. 1, canister-purge valve 118 controls the purging of fuel vapors from canister 22 into the intake manifold, specifically into only cylinder 4, along purge line 82. A check valve (not shown) may be coupled in the purge line 82 to prevent backflow from the intake manifold into canister 22. The inventors herein have recognized that reliable air-fuel ratio control can be achieved during purging conditions by selectively purging the fuel vapors to the cylinder group dedicated for providing external EGR to other engine cylinders since the dedicated EGR cylinder is operated rich for hydrogen generation and therefore has a higher tolerance for air fuel ratio excursions. Thus, at least a portion of the enrichment of cylinder 4 required for generating hydrogen rich external EGR can be provided by purging canister fuel vapors to the cylinder 4, reducing the fueling requirement of cylinder 4.

When purging conditions are met, such as when the canister is saturated, vapors stored in fuel vapor canister 22 may be purged only to the cylinders of the second cylinder group (herein only cylinder 4, and not to cylinders 1-3) by opening canister purge valve 118. Fuel vapors from canister 22 are then drawn into cylinder 4 using engine intake manifold vacuum. While a single canister 22 is shown, it will be appreciated that any number of canisters may be coupled in engine system 100. In one example, canister purge valve 118 may be a solenoid valve wherein opening or closing of the valve is performed via actuation of a canister purge solenoid. Canister 22 further includes a vent 117 for routing gases out of the canister 22 to the atmosphere when storing, or trapping, fuel vapors from fuel tank 26. Vent 117 may also allow fresh air to be drawn into fuel vapor canister 22 when purging stored fuel vapors to intake manifold 144 via purge line 82 and purge valve 118. While this example shows vent 117 communicating with fresh, unheated air, various modifications may also be used. Vent 117 may include a canister vent valve 120 to adjust a flow of air and vapors between canister 22 and the atmosphere. A pressure of fuel vapors in canister 22 may be determined by a dedicated canister pressure sensor.

Combustion chambers 30 of engine 10 may be arranged above a lubricant-filled crankcase 114, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor, un-burned air, and exhaust gases may 'blow by' the piston rings and enter the crankcase over time. To reduce the degrading effects of the fuel vapor on the viscosity of the engine lubricant and to reduce the discharge of the vapor into the atmosphere, the crankcase may be continuously or periodically ventilated, as further described hereinafter. In the configuration shown in FIG. 1, crankcase ventilation valve 28 controls the purging of fuel vapors from the crankcase into the intake manifold, specifically into cylinder 4, along crankcase ventilation line 80. Ventilation line 80 merges with purge line 82 upstream of an intake port of the second group of cylinders 18 (cylinder 4). As discussed with reference to fuel system canister purging, crankcase fuel vapors may be selectively purged to the cylinder group dedicated for providing external EGR to other engine cylinders since the dedicated EGR cylinder is operated rich for hydrogen generation and therefore has a higher tolerance for air fuel ratio excursions. Thus, at least a portion of the enrichment of cylinder 4 required for generating hydrogen rich external EGR can be provided by purging crankcase fuel vapors to cylinder 4, reducing the fueling requirement of cylinder 4.

In one embodiment, crankcase ventilation valve 28 may be a one-way passive valve that provides continual evacuation of crankcase gases from inside the crankcase 114 before connecting to the intake manifold. The one-way valve may seal when flow through crankcase ventilation line 80 would tend to flow in the opposite direction. In another embodiment, crankcase ventilation valve 28 may be a valve that varies its flow restriction in response to the pressure drop across it (or flow rate through it). In still other examples, the crankcase ventilation valve may be an electronically controlled valve. Therein, controller 12 may command a signal to change a position of the valve from an open position (or a position of high flow) to a closed position (or a position of low flow), or vice versa, or any position there-between.

It will be appreciated that, as used herein, crankcase ventilation flow refers to the flow of fuel vapor and gases from the crankcase to the intake manifold along ventilation line 80. Similarly, as used herein, crankcase backflow refers to the flow of fuel vapors and gases along ventilation line 80 from the intake manifold to the crankcase. Backflow may occur when intake manifold pressure is higher than crankcase pressure (e.g., during boosted engine operation). In some embodiments, a check valve (not shown) may be coupled between intake manifold 25 and crankcase 114, along ventilation line 80, for preventing crankcase backflow. A pressure of fuel vapors in crankcase 114 may be determined by a dedicated crankcase pressure sensor.

Crankcase 114 may include one or more oil separators 94 for separating oil from the crankcase vapors (or "blowby gas") before the vapors are purged to cylinder 4. Only one oil separator 94 is shown as the depicted configuration enables unidirectional crankcase ventilation.

During non-boosted conditions, fresh air is drawn into crankcase 114 from air cleaner 56 along vent tube 77. Crankcase fuel vapors and gases are then vented out along ventilation line 80 and delivered to the second group of cylinders in the intake manifold using intake manifold vacuum.

In this way, each of crankcase fuel vapors and canister fuel vapors are purged to the dedicated EGR cylinder group of the engine, and not to the remaining engine cylinders. External EGR from the dedicated EGR cylinder group is then recirculated back to all engine cylinders, upon hydrogen enrichment.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 24, MAF sensor 119, exhaust gas temperature and pressure sensors 128 and 129, and exhaust gas air-fuel ratio sensors 51, 52, and crankcase ventilation pressure sensor 62. Example actuators include throttle 20, fuel injector 66, canister purge valve 118, canister vent valve 120, crankcase ventilation valve 28, dedicated cylinder group valve 65, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIG. 3.

Referring to FIG. 2, internal combustion engine 10 comprising a plurality of cylinders as shown in FIG. 1, one cylinder of which is described now. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 170 as sensed by accelerator pedal sensor 174. A voltage or current indicative of driver demand torque is output from accelerator pedal sensor 174 when driver's foot 172 operates accelerator pedal 170.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 44; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-2 provides for an engine system that allows for selective purging of fuel vapors from one or more of a fuel system canister and a crankcase to enrich only a dedicated EGR cylinder group of a multi-cylinder engine, and recirculation of exhaust gas from the dedicated EGR cylinder group to each of remaining engine cylinders and the dedicated cylinder group.

Figure 3:
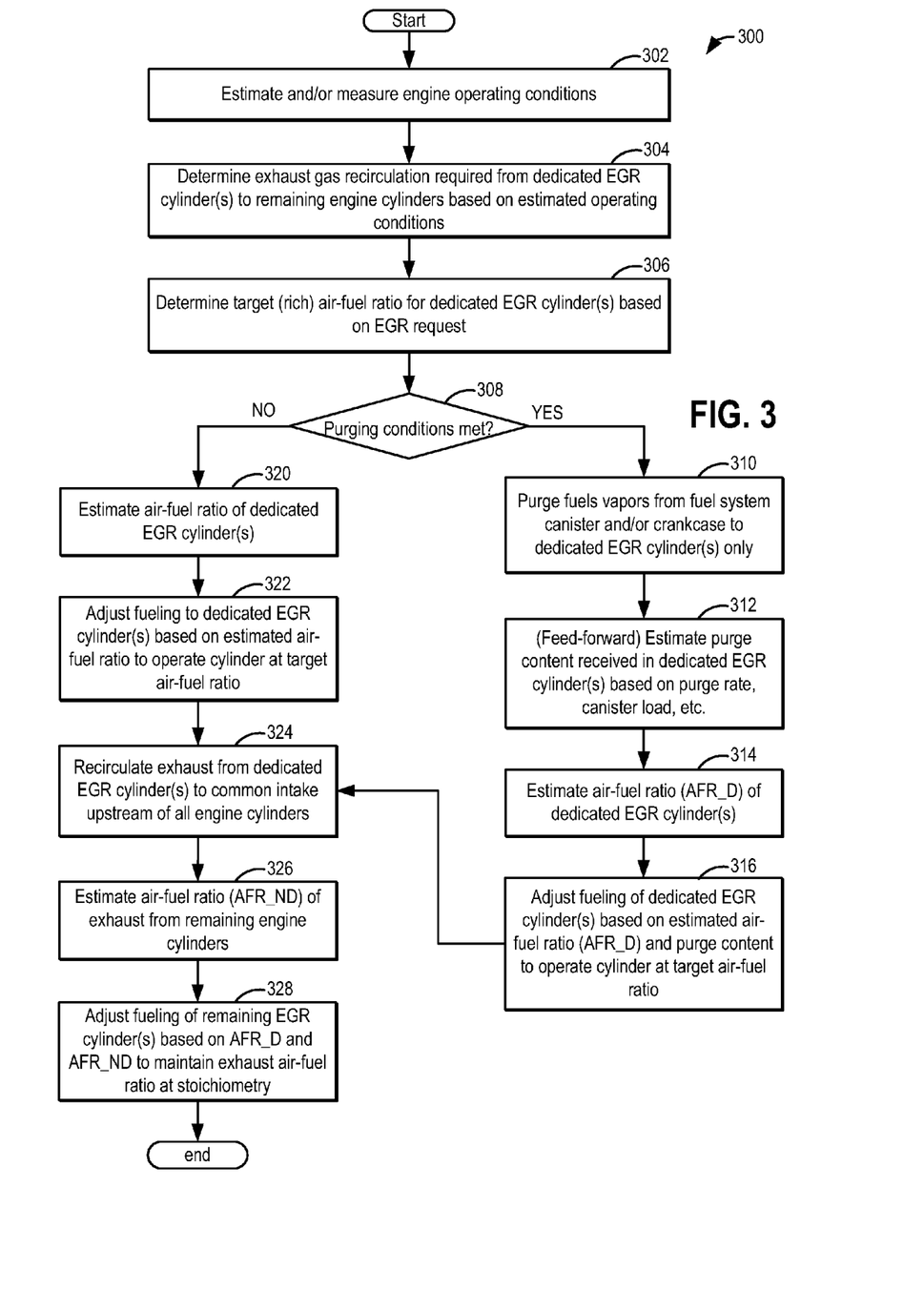
FIG. 3 shows an example method for purging fuel vapors to a dedicated EGR cylinder while adjusting fueling for engine air-fuel ratio control.

Turning now to FIG. 3, an example method 300 is shown for adjusting fueling of a dedicated EGR cylinder group and remaining engine cylinders of a multi-cylinder engine based on purging conditions to maintain an air-fuel ratio of each cylinder group at a target air-fuel ratio.

At 302, the routine includes estimating and/or measuring engine operating conditions such as engine speed, load, boost, MAP, intake air flow, ambient conditions such as ambient pressure, temperature, humidity, etc. At 304, an amount of exhaust gas recirculation (EGR) required may be determined based on engine operating conditions. Specifically, an amount of engine dilution required may be determined based on the engine operating conditions, and an EGR rate may be determined based on the required engine dilution. As such, the EGR may be provided by recirculating exhaust from only the dedicated EGR cylinder group (for example, from only cylinder 4 of engine 10 in FIGS. 1-2) to all engine cylinders (to all of cylinders 1-4).

At 306, a target air-fuel ratio may be determined for operation of the dedicated EGR cylinder(s) based on the engine dilution requested. For example, the target air-fuel ratio may be selected to provide a desired amount of EGR to the engine. Alternatively, the target air-fuel ratio may be selected to provide a desired amount of EGR combustion tolerance to the engine. That is, the target air-fuel ratio may generate sufficient hydrogen so that the engine can be operated with the desired amount of EGR (e.g., at higher EGR levels) without incurring combustion stability issues. In particular, only the dedicated EGR cylinders may be enriched. Enriching the dedicated EGR cylinder group may include operating the dedicated EGR cylinder group (and not the remaining engine cylinders) richer than stoichiometry, a degree of richness adjusted to provide the requested amount of exhaust gas recirculation to the remaining engine cylinders.

As discussed with reference to FIGS. 1-2, exhaust gas from the dedicated EGR cylinder group is delivered to a water gas shift catalyst coupled downstream of the dedicated EGR cylinder group before recirculating the exhaust gas to each of the remaining engine cylinders. The water gas shift catalyst uses carbon monoxide from the rich exhaust to create extra hydrogen. The hydrogen enriched exhaust is then recirculated to the engine intake. Thus, the hydrogen concentration of the exhaust gas received at the water gas shift catalyst from the dedicated EGR cylinder group is lower than the hydrogen concentration of the exhaust gas recirculated to each of the remaining engine cylinders and the dedicated EGR cylinder from the water gas shift catalyst. By recirculating hydrogen rich EGR to the engine, a larger amount of engine dilution can be provided before incurring combustion stability issues.

At 308, it may be determined if purging conditions have been met. In particular, it may be determined if conditions are present for purging fuel vapors from a fuel system canister and/or for purging crankcase gases from a crankcase. Canister purging conditions may be confirmed in response to a canister load being higher than a threshold, or in response to a threshold duration having elapsed since the last canister purge. Crankcase ventilation conditions may be confirmed in response to crankcase pressure, or in response to a threshold duration having elapsed since the last crankcase purge. In an alternate example, the crankcase may be continually ventilated.

If crankcase purging conditions are not confirmed, at 320, the routine includes estimating an exhaust air-fuel ratio of the dedicated EGR cylinders (AFR_D). For example, the air-fuel ratio may be estimated based on feedback from a first exhaust gas sensor (e.g., air-fuel ratio sensor such as a UEGO sensor) coupled downstream of the dedicated EGR cylinder group (such as sensor 51 in passage 50). At 322, the routine includes adjusting fueling to the dedicated EGR cylinder(s) based on the estimated air-fuel ratio to operate the dedicated EGR cylinder(s) at the target (richer than stoichiometry) air-fuel ratio. Thus, fuel may be added to the dedicated EGR cylinder(s) based on a difference between the estimated air-fuel ratio and the target rich air-fuel ratio. At 324, the routine includes recirculating exhaust gas from the dedicated EGR cylinder group to all engine cylinders (to each of the remaining engine cylinders and the dedicated EGR cylinder group).

At 326, the routine includes estimating an exhaust air-fuel ratio of the remaining EGR cylinders (AFR_ND). For example, the air-fuel ratio may be estimated based on feedback from a second exhaust gas sensor (e.g., exhaust gas air-fuel ratio sensor such as a UEGO sensor,) coupled downstream of the remaining engine cylinders (such as sensor 56). At 328, the routine includes adjusting fueling to each of the remaining engine cylinders based on the EGR received from the dedicated EGR cylinder group to maintain an exhaust air-fuel ratio of the engine at or around stoichiometry. For example, the remaining engine cylinders may be fueled leaner than stoichiometry as the degree of richness of the exhaust received from the dedicated EGR cylinder group increases.

Returning to 308, if purging conditions are confirmed, then at 310, the routine includes selectively purging fuel vapors from one or more of a fuel system canister and a crankcase to enrich only the dedicated EGR cylinder group of the multi-cylinder engine. As such, the selective purging further includes not purging the fuel vapors to any of the remaining engine cylinders of the engine. At 312, the routine includes feed-forward estimating the purge content received in the dedicated EGR cylinder group. The feed-forward purge content estimate may be based on a purge rate of the canister purge valve, canister load, crankcase pressure, etc.

At 314, the routine includes estimating the exhaust air-fuel ratio of the dedicated EGR cylinders (AFR_D). For example, the air-fuel ratio may be estimated based on feedback from the first exhaust gas sensor (air-fuel ratio sensor) coupled downstream of the dedicated EGR cylinder group (such as sensor 51 in passage 50). At 316, the routine includes adjusting a fueling of the dedicated EGR cylinder group based on the feed-forward estimate of fuel vapor purging into the dedicated EGR cylinder group and further based on the sensor feedback of exhaust air-fuel ratio of the dedicated EGR cylinder group. In particular, the fueling of the dedicated EGR cylinder group may be decreased as the feed-forward estimate of fuel vapor purging increases to maintain the exhaust air-fuel ratio of the dedicated EGR cylinder group at the target air fuel ratio, and provide the degree of richness required in the dedicated EGR cylinder group to provide the required amount of EGR to the remaining engine cylinders. In other words, as the amount of purge vapors received from the fuel canister and/or the crankcase increases, the amount of fueling required in the dedicated EGR cylinder group to reach the target degree of richness for sufficient hydrogen generation at the WGS catalyst, and deliver the target rate of engine dilution, decreases. The hydrogen improves the combustion stability with EGR and allows for an improvement in fuel economy.

From 316, the routine moves to 324 to recirculate exhaust gas from the dedicated EGR cylinder group to each of the remaining engine cylinders and the dedicated EGR cylinder group. In particular, exhaust is recirculated from only the dedicated EGR cylinder group to the engine intake manifold, upstream of the intake port of all the engine cylinders. At 326, an exhaust air-fuel ratio of the remaining EGR cylinders (AFR_ND) is estimated based on feedback from the second exhaust gas sensor coupled downstream of the non-dedicated engine cylinders. At 328, fueling to each of the remaining engine cylinders is adjusted based on the EGR received from the dedicated EGR cylinder group to maintain an exhaust air-fuel ratio of the engine at or around stoichiometry. For example, the remaining engine cylinders may be fueled leaner than stoichiometry as the amount of exhaust gas recirculation received from the dedicated EGR cylinder group increases. Likewise, as the amount of purge vapors received in the dedicated EGR cylinder group increases, less fuel injection is required in the dedicated EGR cylinder to achieve the desired rich air/fuel ratio.

Figure 4:
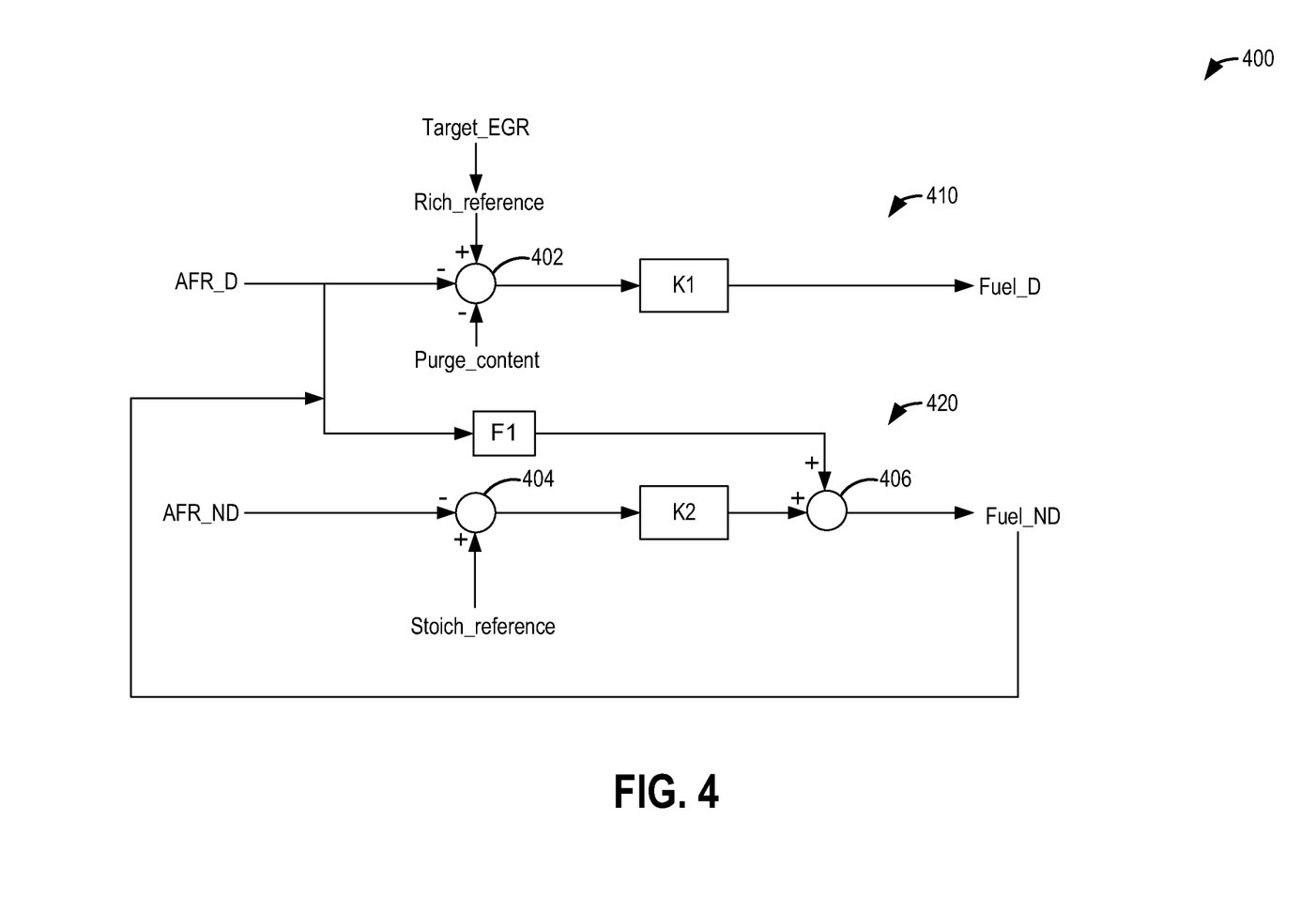
FIG. 4 shows a schematic depiction of routine for fueling dedicated and non-dedicated EGR cylinders based on purge vapor content.

The fuel adjustment routine of FIG. 3 is depicted as a block diagram at routine 400 of FIG. 4. Routine 400 comprises a first sub-routine 410 for determining an amount of fuel to be delivered to the dedicated engine cylinder group and a second sub-routine 420 for determining an amount of fuel to be delivered to the non-dedicated EGR cylinder group. Fueling of the dedicated EGR cylinder group is adjusted to operate the cylinder group richer than stoichiometry, while fueling of the non-dedicated EGR cylinder group is adjusted to operate the cylinder group at stoichiometry.

Sub-routine 410 includes receiving, at 402, inputs regarding an estimated exhaust air-fuel ratio of the dedicated cylinder group (AFR_D), a desired degree of richness (Rich_reference), and a feed-forward estimate of the purge content (Purge_content). The estimated exhaust air-fuel ratio of the dedicated cylinder group (AFR_D) may be based on feedback from an exhaust sensor coupled downstream of the dedicated cylinder group, such as in the EGR passage recirculating exhaust from the dedicated EGR cylinder group to the engine intake. The desired degree of richness may be determined based on an amount of engine dilution required (Target_EGR) under the prevalent engine operating conditions. For example, as the amount of engine dilution requested increases, the desired degree of richness may be increased so that more hydrogen can be produced at the WGS catalyst downstream of the dedicated EGR cylinder group.

Based on a comparison between the actual air-fuel ratio, in combination with the purge air, from the target air-fuel ratio, a deviation is calculated. The deviation is sent to a first controller K1 which then calculates an amount of fuel to be injected into the dedicated EGR cylinder group (Fuel_D). The first controller K1 may be a first proportional integral derivative (PID) controller, for example.

Sub-routine 420 includes receiving, at 404, inputs regarding an estimated exhaust air-fuel ratio of the non-dedicated cylinder group (AFR_ND), and a desired exhaust air-fuel ratio which herein is at stoichiometry (Stoich_reference). The estimated exhaust air-fuel ratio of the non-dedicated cylinder group (AFR_ND) may be based on feedback from a second exhaust sensor coupled downstream of the dedicated cylinder group, such as in the exhaust manifold section immediately downstream of the non-dedicated EGR cylinder group. Based on a comparison between the actual air-fuel ratio of the non-dedicated EGR cylinder group and the target stoichiometric air-fuel ratio, a deviation is calculated. The deviation is then sent to a second controller K2, which may also be a PID controller. The output of the second controller is then compared to a filtered estimate of the air-fuel ratio of the dedicated EGR cylinder group (AFR_D). Specifically, AFR_D may be filtered upon passage through filter F1 before being compared to the output of the second controller. The output of filter F1 is compared to the output of controller K2 at 406 to determine the amount of fuel to be injected to the non-dedicated cylinder group (Fuel_ND). As such, this may constitute a feed-forward part of the fueling loop. In addition, feedback regarding the amount of fuel injected into the non-dedicated cylinder group is received as input to the filter F1.

In this way, a method is provided wherein fueling of a dedicated EGR cylinder, configured to recirculate exhaust to reach of remaining engine cylinders, is adjusted responsive to an estimate of fuel vapors purged only to the dedicated cylinder and response to a first exhaust air-fuel ratio of the dedicated cylinder. The fuel vapors purged to the dedicated cylinder include one or more of fuel system canister fuel vapors and positive crankcase ventilation fuel vapors, the fuel vapors not purged to any of the remaining engine cylinders. As such, the estimate of fuel vapors purged may be a feed-forward estimate based on a purge flow rate. The fueling of the dedicated cylinder is adjusted to operate the dedicated cylinder with a target air-fuel ratio richer than stoichiometry, the target air-fuel ratio selected to provide an amount of exhaust gas recirculation to the remaining engine cylinders. For example, the degree of richness of fueling the dedicated cylinder may be decreased as the estimate of fuel vapors purged to the dedicated cylinder increases and/or as the first exhaust air-fuel ratio approaches the target air-fuel ratio.

In comparison, fueling of the remaining engine cylinders is adjusted responsive to the first exhaust air-fuel ratio and responsive to a second air-fuel ratio of the remaining engine cylinders. Herein, the first exhaust air-fuel ratio is estimated by a first air-fuel ratio sensor coupled downstream of only the dedicated cylinder and the second exhaust air-fuel ratio is estimated by a second air-fuel ratio sensor coupled downstream of only the remaining engine cylinders. For example, the fueling of the remaining engine cylinders may be adjusted to maintain the second air-fuel ratio at or around stoichiometry, the fueling of the remaining engine cylinders enleaned further as the first air-fuel ratio decreases. This allows accurate air-fuel ratio control at the engine during purging, even if a very accurate purge content estimate is not possible.

Figure 5:
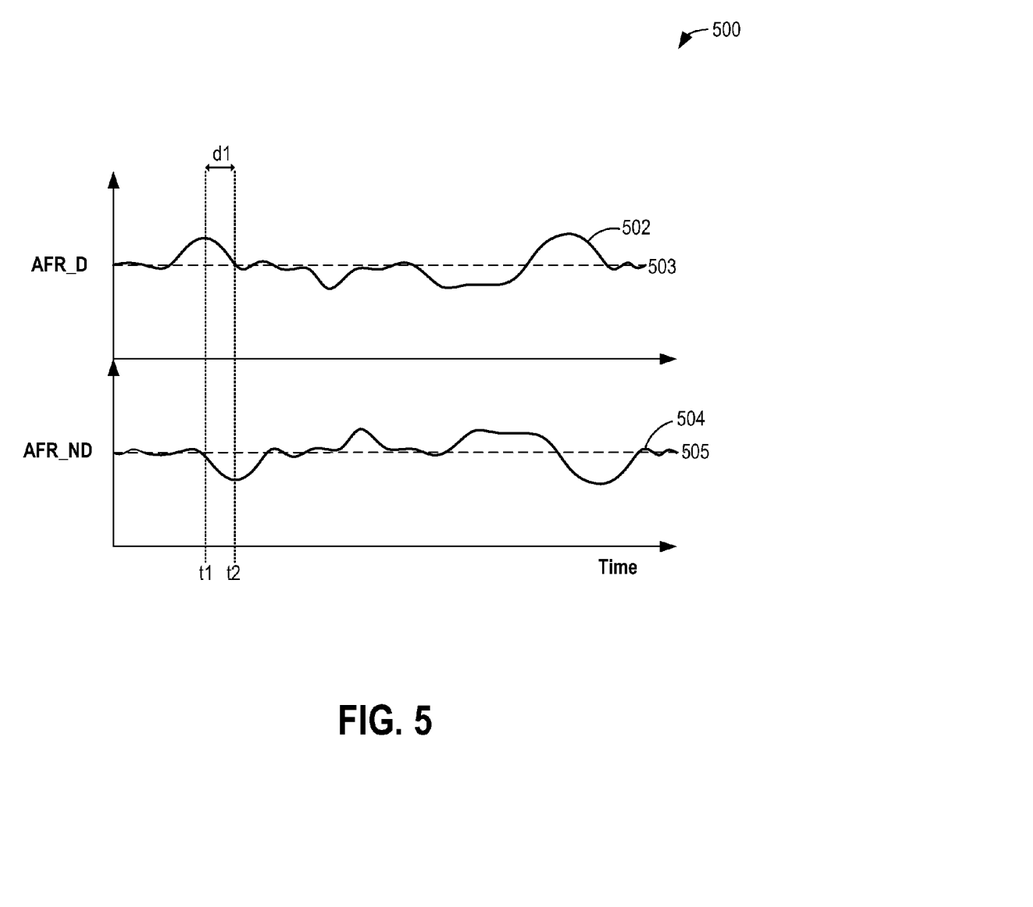
FIG. 5 shows an example of air-fuel ratio control in dedicated and non-dedicated EGR cylinders of the engine system of FIG. 1.

FIG. 5 shows a map 500 depicting an example adjusting of fueling to the dedicated and non-dedicated EGR cylinder group to allow for air-fuel ratio (AFR) control. Map 500 depicts changes in the air-fuel ratio of the dedicated cylinder group (AFR_D) at plot 502 and changes in the air-fuel ratio of the non-dedicated cylinder group (AFR_ND) at plot 504. Both plots are shown over time (along the x-axis).

Plot 502 shows changes in AFR_D in comparison to a target rich setting 503 (dashed line). Based on changes in fueling as well as the purge content received in the dedicated EGR cylinder group, the air-fuel ratio may intermittently hover leaner than the rich setting (as shown before t1) or hover richer than the rich setting (as shown after t2). The AFR_D may be adjusted leaner than the target rich setting 503 if extra Hydrogen is not needed for combustion stability or the dedicated EGR cylinder reaches its "rich limit" under the given operating conditions. Alternatively the AFR_D may be adjusted richer than the target rich setting if additional Hydrogen is needed for combustion stability and the dedicated EGR cylinder has not reached its "rich limit". For example, the AFR of the dedicated cylinder group may transiently increase (as shown before t1). The rich exhaust from the dedicated cylinder group is received in the remaining engine cylinders. Therefore, in response to the change in AFR_D, the fueling of the non-dedicated cylinder group is adjusted so that the overall exhaust air-fuel ratio of the cylinders is at or around stoichiometry. For example, during conditions when the exhaust received from the dedicated cylinder group is richer, as seen after t1, the fueling of the non-dedicated cylinder group is adjusted to be leaner. As such, due to the time delay involved in receiving of the rich exhaust in the intake manifold, and manifold mixing delays, there may be a lag d1 between the change in the air-fuel ratio of the dedicated cylinder group and the change in the air-fuel ratio of the non-dedicated cylinder group.

In this way, fueling and air-fuel ratio control of the dedicated EGR cylinder group and the non-dedicated EGR cylinder group is coordinated so that stoichiometric exhaust air-fuel ratio can be maintained even while purge fuel vapors are received in the dedicated cylinder group.

Figure 6:
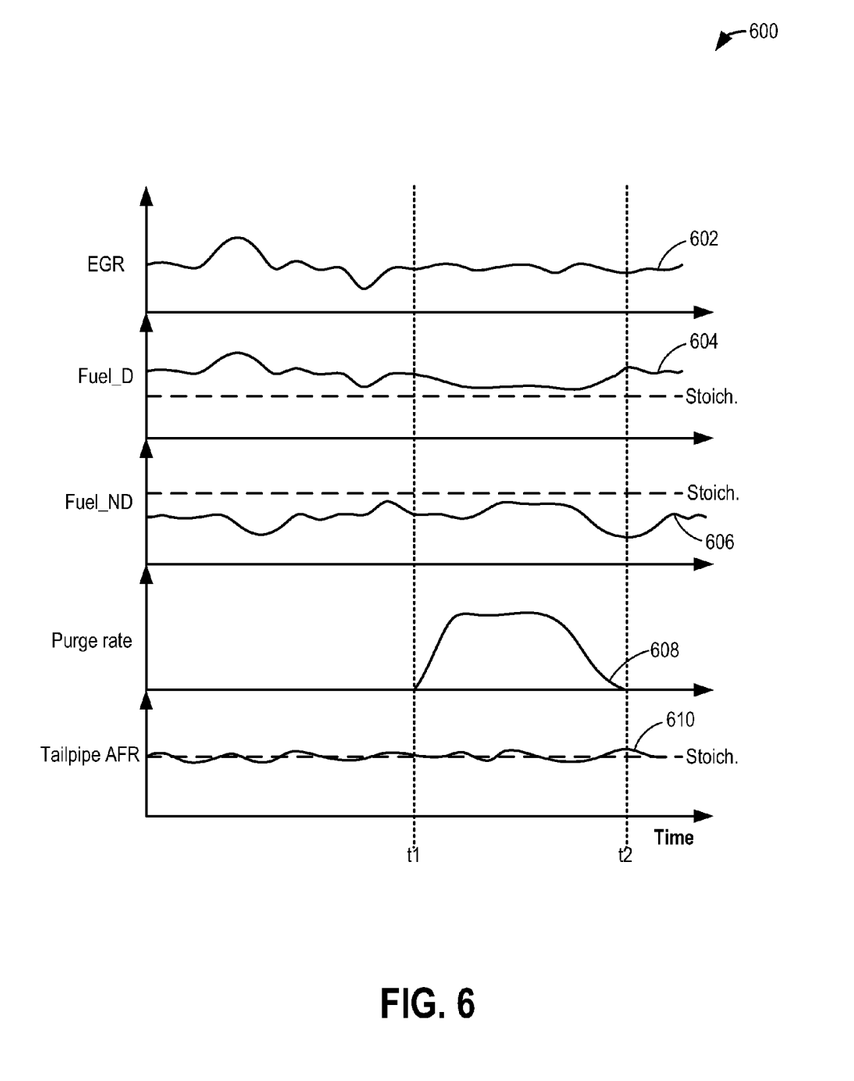
FIG. 6 shows an example fueling adjustment to dedicated and non-dedicated EGR cylinders of an engine system for air-fuel ratio control.

Now turning to FIG. 6, an example adjusting of fueling to the dedicated and non-dedicated EGR cylinder group while receiving purge fuel vapors is depicted. The method allow for air-fuel ratio (AFR) control. Map 600 depicts changes in engine dilution or EGR demand at plot 602, fueling of the dedicated cylinder group (Fuel_D) is shown at plot 604, fueling of the non-dedicated cylinder group (Fuel_ND) is shown at plot 606, selective purging of fuel vapors to the dedicated cylinder group is shown at plot 608, and an exhaust tailpipe air-fuel ratio estimate is shown at plot 610. All plots are shown over time (along the x-axis).

Prior to t1, fueling of the dedicated cylinder group may be adjusted based on the engine dilution requirement. As such, prior to t1, purging conditions may not be confirmed and stored fuel vapors may not be received in any engine cylinder. Specifically, as the engine dilution requirement increases, fueling of the dedicated cylinder group is adjusted to be richer than stoichiometry (dashed line) so that the water gas shift catalyst coupled downstream of the dedicated cylinder group can generate more hydrogen using hydrocarbons from the rich exhaust. The hydrogen enriched exhaust is then recirculated from the dedicated EGR cylinder group to the engine intake where it is ingested by the remaining engine cylinders and the dedicated EGR cylinder group. As the richness of the exhaust received from the dedicated EGR cylinder group increases, fueling of the remaining engine cylinders in the non-dedicated EGR cylinder group may be enleaned so that the tailpipe exhaust can be maintained at or around stoichiometry. For example, when the degree of richness of fueling of the dedicated cylinder group increases, a degree of leanness of fueling of the non-dedicated EGR cylinder group may also be correspondingly increased.

At t1, purging conditions may be confirmed. In response to the purging conditions being met, fuel vapors from one or more of a fuel system fuel vapor canister and/or the crankcase may be received selectively in only the dedicated cylinder group. The fuels may be purged at a gradually increasing purge rate until the purge rate stabilizes. As such, the purge vapors are delivered selectively to only the dedicated EGR cylinder group and not to any of the remaining cylinders in the non-dedicated EGR cylinder group. The purge vapors may therefore constitute at least a portion of the enrichment required in the dedicated EGR cylinder group for providing the requested engine dilution. Therefore, as the purge rate increases and the amount of purge vapors received in the dedicated EGR cylinder group increases, the rich fueling of the dedicated EGR cylinder group may be decreased. In other words, less fuel may need to be injected into the dedicated EGR cylinder group to maintain the required rich exhaust air-to-fuel ratio for providing EGR to remaining engine cylinders. For example, a fueling of the dedicated EGR cylinder group closer to stoichiometric fueling may be enabled.

At t2, the canister load may be sufficiently low and purging may be discontinued. Accordingly, the purge rate may drop and the rich fueling of the dedicated EGR cylinder group may be increased while the lean fueling of the non-dedicated EGR cylinder group is correspondingly increased. As such, the coordinated fueling adjustments of the dedicated EGR cylinder group and the non-dedicated EGR cylinder group, in the presence or absence of purge fuel vapors, allow the tailpipe exhaust air-fuel ratio to be maintained at or around stoichiometry during engine operation.

In one example, an engine system comprises a first group of cylinders, a second group of cylinders, a first exhaust catalyst coupled downstream of only the first group of cylinders, a second exhaust catalyst coupled downstream of each of the first and second group of cylinders and an EGR passage configured to recirculate exhaust from only the first group of cylinders to a common engine intake, the common engine intake supplying aircharge to each of the first and second group of cylinders. The first exhaust catalyst may be a water gas shift catalyst while the second exhaust catalyst may be a three-way catalyst. The engine system may further comprise a fuel system canister, a crankcase, a purge passage configured to purge fuel vapors from each of the canister and the crankcase to only the first group of cylinders, a first exhaust air-fuel ratio sensor coupled downstream of the first group of cylinders, a second exhaust air-fuel ratio sensor coupled downstream of the second group of cylinders, and a controller. The controller may be configured with computer-readable instructions for adjusting fueling of the first group of cylinders based on an amount of purge fuel vapors received at the first group of cylinders to provide a target exhaust gas recirculation to the second group of cylinders. Further, the controller may include instructions for adjusting fueling of the second group of cylinder based on the exhaust gas recirculation received from the first group of cylinders to maintain a stoichiometric exhaust air-fuel ratio. The fueling of the first group of cylinders may be enriched as the amount of purge fuel vapors received decreases and as the output of the first exhaust air-fuel ratio sensor increases. The fueling of the second group of cylinders may be enleaned as the exhaust gas recirculation received from the first group of cylinders increases and as the output of the second exhaust air-fuel ratio sensor decreases.

In this way, by selectively receiving purge fuel vapors in a dedicated EGR cylinder group, control of purge and PCV vapors is simplified and improved. In addition, the overall richness and hydrogen generation of the dedicated EGR cylinder improves fuel economy by improving EGR tolerance of the engine. By using purge vapors to provide at least a portion of the enrichment of the dedicated EGR cylinder, control of purge and PCV is improved as all the fuel rich vapors are directed to the rich dedicated EGR cylinder. By enriching the dedicated EGR cylinder to recirculate hydrogen enriched exhaust to the engine, combustion stability of the engine is improved, even when operating at high engine dilutions. By improving the range of operating conditions where EGR can be delivered without incurring combustion stability issues, further improvements in fuel economy and engine performance are achieved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    selectively purging fuel vapors from one or more of a fuel system canister and a crankcase to only a dedicated EGR cylinder group of a multi-cylinder engine to enrich the dedicated EGR cylinder group; and
    recirculating exhaust gas from the dedicated EGR cylinder group to each of remaining engine cylinders and the dedicated cylinder group.

2. The method of claim 1, wherein the selectively purging further includes not purging fuel vapors to any of the remaining engine cylinders and further comprising, responsive to the selectively purging fuel vapors to enrich only the dedicated EGR cylinder group, adjusting fueling to the dedicated EGR cylinder group based on an estimate of purge content of the purged fuel vapors and an air-fuel ratio of the dedicated EGR cylinder group.

3. The method of claim 1, wherein enriching the dedicated EGR cylinder group includes operating the dedicated EGR cylinder group richer than stoichiometry and wherein operating the dedicated EGR cylinder group richer than stoichiometry includes adjusting a degree of richness by adjusting fueling of the dedicated EGR cylinder group to provide a target amount of exhaust gas recirculation to the remaining engine cylinders.

4. The method of claim 3, wherein exhaust gas from the dedicated EGR cylinder group is delivered to a water gas shift catalyst coupled downstream of the dedicated EGR cylinder group before recirculating the exhaust gas to each of the remaining engine cylinders.

5. The method of claim 4, wherein a hydrogen concentration of the exhaust gas received at the water gas shift catalyst from the dedicated EGR cylinder group is lower than a hydrogen concentration of exhaust gas recirculated to each of the remaining engine cylinders from the water gas shift catalyst.

6. The method of claim 5, further comprising, adjusting fueling of the dedicated EGR cylinder group based on a feed-forward estimate of fuel vapor purging into the dedicated EGR cylinder group and further based on sensor feedback of exhaust air-fuel ratio in the dedicated EGR cylinder group.

7. The method of claim 6, wherein the fueling of the dedicated EGR cylinder group is decreased as the feed-forward estimate of fuel vapor purging increases to maintain the exhaust air-fuel ratio in the dedicated EGR cylinder group at the degree of richness required to provide the amount of exhaust gas recirculation to the remaining engine cylinders.

8. The method of claim 7, further comprising adjusting fueling to each of the remaining engine cylinders based on the exhaust gas recirculation received from the dedicated EGR cylinder group to maintain an exhaust air-fuel ratio of the remaining engine cylinders at or around stoichiometry.

9. The method of claim 8, wherein adjusting the fueling to each of the remaining engine cylinders includes fueling the remaining engine cylinders leaner than stoichiometry, where an amount of leanness increases as the amount of exhaust gas recirculation received from the dedicated EGR cylinder group increases.

10. The method of claim 8, wherein adjusting the fueling to each of the remaining engine cylinders includes fueling the remaining engine cylinders leaner than stoichiometry, where a degree of leanness increases as the degree of richness of the dedicated EGR cylinder group increases and wherein fueling the remaining cylinders leaner than stoichiometry includes adjusting the degree of leanness to maintain a tailpipe exhaust at or around stoichiometry.

11. A method, comprising:
adjusting fueling of a dedicated cylinder, configured to recirculate exhaust to each of remaining engine cylinders, responsive to an estimate of fuel vapors purged only to the dedicated cylinder and responsive to a first exhaust air-fuel ratio of the dedicated cylinder; and
adjusting fueling of the remaining engine cylinders responsive to the first exhaust air-fuel ratio and responsive to a second air-fuel ratio of the remaining engine cylinders.

12. The method of claim 11, wherein the first exhaust air-fuel ratio is estimated by a first air-fuel ratio sensor coupled downstream of only the dedicated cylinder, and wherein the second exhaust air-fuel ratio is estimated by a second air-fuel ratio sensor coupled downstream of only the remaining engine cylinders and wherein adjusting fueling of the dedicated cylinder includes adjusting an amount of fuel delivered to the dedicated cylinder.

13. The method of claim 12, wherein the fuel vapors purged only to the dedicated cylinder include one or more of fuel system canister fuel vapors and positive crankcase ventilation fuel vapors, and wherein the fuel vapors are not purged to any of the remaining engine cylinders.

14. The method of claim 13, wherein the estimate of fuel vapors purged is a feed-forward estimate based on a purge flow rate of the fuel vapors purged from one or more of a fuel system canister and a crankcase.

15. The method of claim 14, wherein the fueling of the dedicated cylinder is adjusted to operate the dedicated cylinder with a target air-fuel ratio richer than stoichiometry, the target air-fuel ratio selected to provide an amount of exhaust gas recirculation combustion tolerance to all the engine cylinders.

16. The method of claim 15, wherein a degree of richness of fueling the dedicated cylinder is decreased as the estimate of fuel vapors purged to the dedicated cylinder increases and as the first exhaust air-fuel ratio approaches the target air-fuel ratio.

17. The method of claim 16, wherein the fueling of the remaining engine cylinders is adjusted to maintain the second air-fuel ratio at or around stoichiometry, the fueling of the remaining engine cylinder enleaned further as the first air-fuel ratio decreases.

18. An engine system, comprising:
a first group of cylinders;
a second group of cylinders;
a first exhaust catalyst coupled downstream of only the first group of cylinders;
a second exhaust catalyst coupled downstream of the second group of cylinders;
an EGR passage configured to recirculate exhaust from only the first group of cylinders to a common engine intake, the common engine intake supplying aircharge to each of the first and second group of cylinders;
a fuel system canister;
a crankcase;
a purge passage configured to purge fuel vapors from each of the canister and the crankcase to only the first group of cylinders;
a first exhaust air-fuel ratio sensor coupled downstream of the first group of cylinders;
a second exhaust air-fuel ratio sensor coupled downstream of the second group of cylinders; and
a controller with computer-readable instructions for:
adjusting fueling of the first group of cylinders based on an amount of purge fuel vapors received at the first group of cylinders to provide a target exhaust gas recirculation combustion tolerance to all the cylinders; and
adjusting fueling of the second group of cylinders based on the exhaust gas recirculation received from the first group of cylinders to maintain a stoichiometric exhaust air-fuel ratio.

19. The system of claim 18, wherein the fueling of the first group of cylinders is enriched as the amount of purge fuel vapors received decreases and as an output of the first exhaust air-fuel ratio sensor increases and wherein the amount of purge fuel vapors received is estimated based on a purge rate of a canister purge valve of the canister, a load of the canister, and a pressure of the crankcase.

20. The system of claim 19, wherein the fueling of the second group of cylinders is enleaned as the exhaust gas recirculation received from the first group of cylinders increases and as an output of the second exhaust air-fuel ratio sensor decreases and wherein the first exhaust air-fuel ratio sensor is positioned in the EGR passage downstream of the first exhaust catalyst.

\* \* \* \* \*